June 14, 1938. V. I. WHITMAN 2,120,586
COMPOSITE MINIATURE PHOTOGRAPHIC APPARATUS
Filed Nov. 5, 1935 2 Sheets-Sheet 1
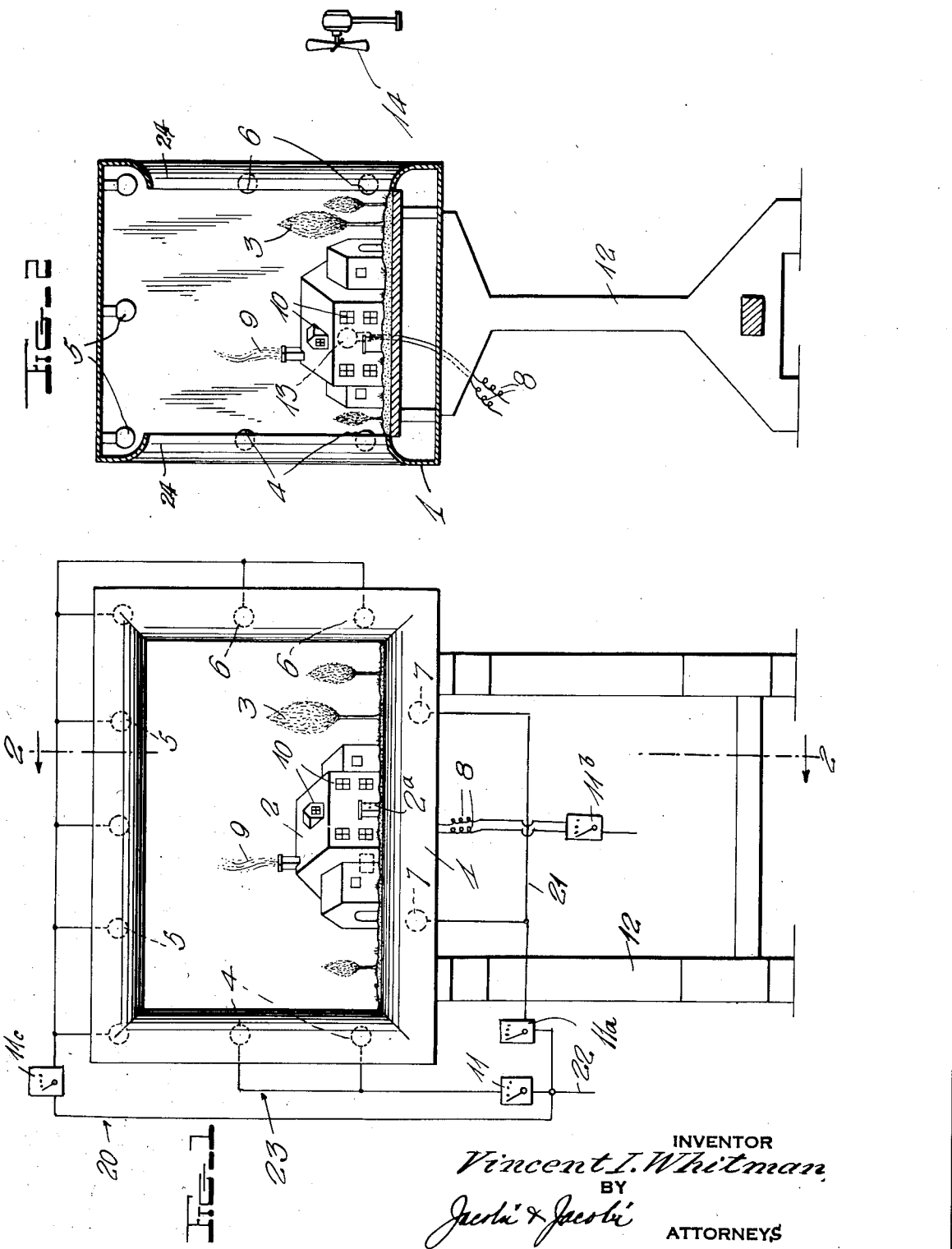
INVENTOR
Vincent I. Whitman
BY
Jacobi & Jacobi
ATTORNEYS

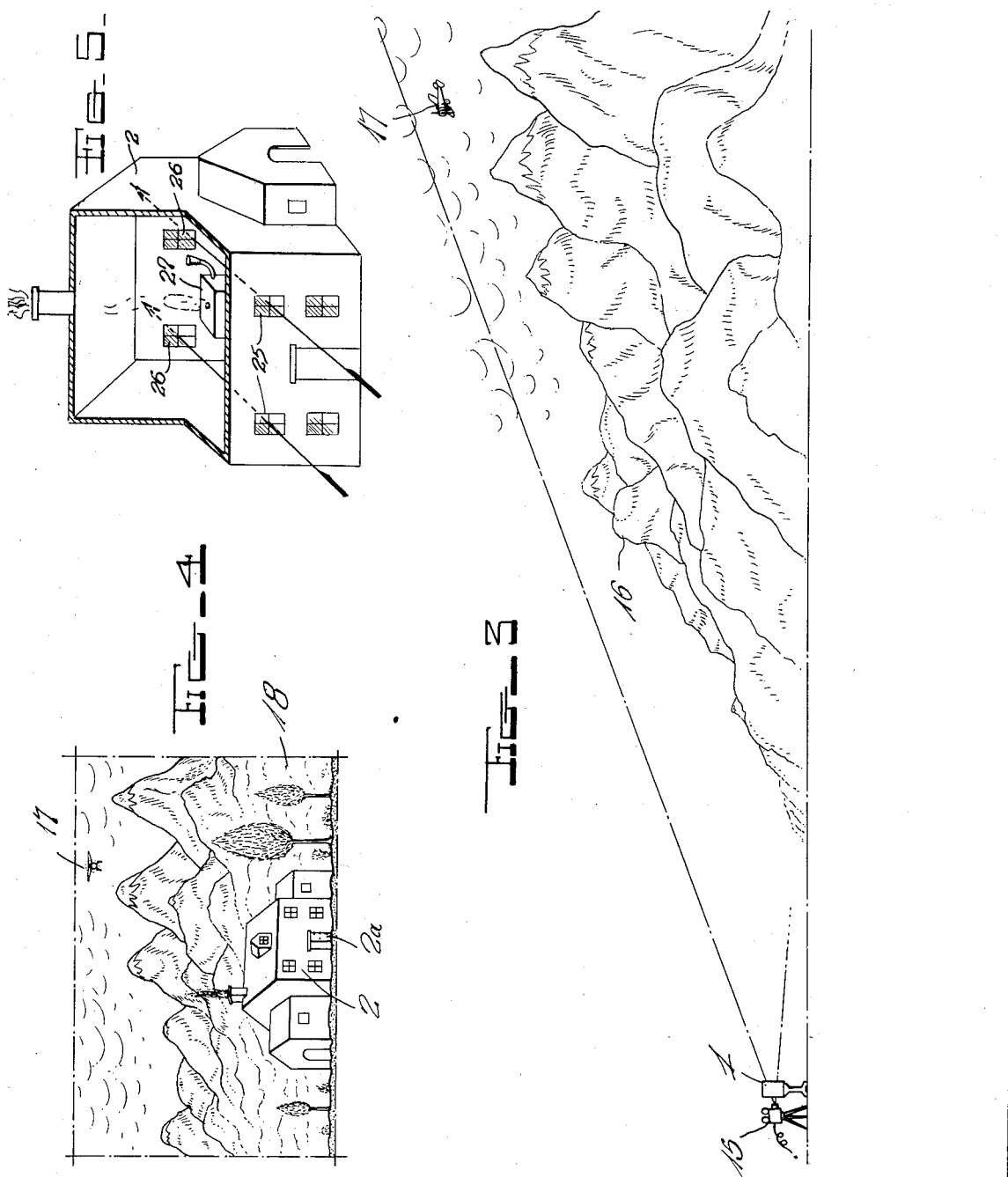

Patented June 14, 1938

2,120,586

UNITED STATES PATENT OFFICE 2,120,586

COMPOSITE MINIATURE PHOTOGRAPHIC APPARATUS

Vincent I. Whitman, New York, N. Y.

Application November 5, 1935, Serial No. 48,408

6 Claims. (Cl. 88—16)

My invention relates to a system of composite motion picture photography wherein a desired background scene is photographed back of a miniature three-dimensional structure to produce a composite motion picture. Actions may be carried out in the background or in the miniature foreground structure or both.

I provide means for moving my miniature structure across the field of view when desired, and for having this structure perform any desired kind of visual actions. I mount my miniature structure on a stage or frame which is provided with lights on both sides and on the top and bottom, which lights may be adjusted in intensity.

My system makes it possible to take a motion picture of an elaborate building or structure before any desired familiar natural scenic background, and to have changes of lighting or position of the structure such as would occur with the actual structure, without incurring the large expense of actually constructing such full-size structure at the location of the desired background.

In the following specification I have described my invention as applied to a miniature three-dimensional house, but my invention is equally applicable to any structure which can be constructed in miniature and suitably illuminated.

My invention will be better understood by reference to the following specification and the accompanying drawings wherein:

Figure 1 is a front view of the miniature structure in its miniature stage setting, with the lighting system;

Figure 2 is a transverse vertical sectional view of the miniature stage setting, taken substantially on the line 2—2 of Figure 1;

Figure 3 is an assembled view of the camera and miniature structure mounted in front of a natural background scene; and Figure 4 is the composite photograph obtained by the arrangement of Figure 3.

Figure 5 shows a detail of the miniature structure and the relative arrangement of the front and back window apertures.

Referring to the figures in detail, in Figure 1, a frame or miniature stage is shown at 1, and carries the miniature three-dimensional actual structure 2, here shown as a miniature house with windows and chimney, and adjacent trees 3. As shown, the structure 2 is large relative to the size of frame 1 and occupies a substantial and relatively large part of the space or field of view enclosed by frame 1. The house or structure is open inside as a real house, and it is possible to see from the front windows 25 of the house through the back windows 26. The portion of the stage or frame not occupied by the miniature structure is open, so that the background scene back of the house is unobstructedly visible from the front of the stage. The stage and house are supported on a suitable standard 12. The house or other structure 2, which may be any one of the various structures herein described, may be slidably mounted on the bottom of frame or stage 1, so that it may be easily translated across the field of view if desired.

The house or structure is provided with a door 2a which is movable as in a real house, and is here shown half open, and with windows 10, which may be lowered or raised, and are provided with individual window shades which may be pulled up and down. The trees 3 are made flexible as a real tree, so that they will bend gracefully when a wind is directed thereon as from fan 14. The house is provided with a chimney from which smoke 9 issues generated from a suitable source 27 inside the house, and is deflected by the wind from fan 14, giving an added illusion of reality. Each room of the house, or each window, may be provided separately with its own miniature light, such as a grain-of-wheat light; such lights are here represented generically by the central light 13 inside the house.

Stage lights are provided on the sides, top, and bottom, of the stage 1, just as on a real stage. The foot lights are 7, the top lights are 5, and the side lights respectively 4 and 6. Each of these groups of lights is provided with the usual reflectors. Means is also provided such as individual rheostats for selectively dimming individual groups of lights as may be desired for each group. I show a rheostat 11 for dimming side lights 4, another rheostat 11a for dimming foot lights 7, and another rheostat 11c for dimming the top lights and remaining side lights. Other individual rheostats may be provided for dimming smaller groups of lights if this is found desirable. The connections to each of these groups of lights are represented schematically by single lines 20, 21, 22, 23, it being understood that this represents two wires. The source of electrical supply is shown as the line 22. The lights 13 inside the house are supplied from a separate source through rheostat 11b. As shown in Figures 1 and 2, the foot lights, top lights, and side lights, are so mounted on the sides of frame 1 that their direct beams are confined or prevented from passing forwardly toward the lens of camera 15, and as shown particularly in Figure 2, the sides of frame 1 are so shaped and provided with concave surfaces 24 in front of the lights as to shield the lights and keep their direct rays from passing forwardly toward the front of the frame and to camera 15. In this way, only the indirect beams reflected from miniature structure 2 and other structures on the stage, reach the lens of camera 15.

Referring to Figure 3, the miniature stage 1 containing the house 2 is shown mounted right in front of the motion picture camera 15, before a natural background scene shown as mountains 16, whereon visual actions are performed represented by airplane 17. Any desired background scene can be used, and any type of visual actions may be performed thereon.

Figure 4 shows the composite photograph 18 obtained by the arrangement of Figure 3, showing the desired background scene with the miniature house occupying the foreground and appearing as a full size structure.

While I have shown a house as a particular miniature structure, my invention is also applicable to any other miniature structure. For instance, the miniature structure may be a sail-boat, a steam-boat, or a railroad train, or other structure, which may be moved across the field of view by suitable translating means. The steamboat may emit smoke as the house. By providing a tank, an ocean liner can be caused to sail across the stage, and can be blown up if desired. Likewise, if desired, the miniature house or other structure may be set on fire, or blown up, and will produce a very realistic effect. The railroad train can be wrecked. The use of a door which will actually open adds an additional element of reality.

A convenient way of forming the miniature house or structure is to mould it from plastic moulding material, in which manner any desired kind of structure can quickly and easily be formed.

A photograph of the house or structure to be represented may be taken, and built out into three dimensions by embossing or bas relief. Also, photographs may be taken from all sides of the house and mounted on a wooden box wherein the doors and windows are then cut, and an extremely realistic reproduction of an elaborate house or structure thus produced.

An important advantage of my invention is that by varying the intensity of the individual groups of lights separately or together, any desired illumination effect can be produced, and shadows can be caused to appear to fall on the house and pass thereover.

By making it possible to take a composite motion picture of any desired elaborate structure as a miniature in front of a desired background scene whereon visual actions are performed, my invention provides a method of producing elaborate motion pictures with far less expense than would be required if the elaborate house or structure had to be constructed full size.

Having thus described the invention what is claimed is:

1. In a controllably illuminated miniature stage setting for use as foreground in composite motion picture photography, a frame comprising a support, said frame being open at front and back, a miniature three-dimensional stage setting comprising a miniature three-dimensional structure positioned on said support within said frame and occupying a relatively large part of the field of view enclosed by said frame, the space enclosed by said frame not occupied by said miniature setting being unobstructed and presenting a clear view through said frame, a plurality of controllable sources of light respectively positioned on the sides of said frame for delivering light on said miniature stage setting, and individual means for selectively controlling the intensity of the illumination delivered from each of said sources.

2. In a controllably illuminated miniature stage setting for use as foreground in composite motion picture photography, a frame comprising a support, said frame being open at front and back, a miniature three-dimensional stage setting comprising a miniature three-dimensional structure positioned on said support within said frame and occupying a relatively large part of the field of view enclosed by said frame, the space enclosed by said frame not occupied by said miniature setting being unobstructed and presenting a clear view through said frame, said structure comprising an interior hollow space, and the front of said structure being provided with apertures connecting with said hollow space, a plurality of controllable sources of light respectively positioned on the sides of said frame for delivering light on said miniature stage setting, an interior source of light positioned in said interior space, and individual means for selectively controlling the intensity of the illumination delivered from each of said sources.

3. In a controllably illuminated miniature stage setting for use as foreground in composite motion picture photography, a frame comprising a support, said frame being open at front and back, a miniature three-dimensional stage setting comprising a miniature three-dimensional structure positioned on said support within said frame and occupying a relatively large part of the field of view enclosed by said frame, the space enclosed by said frame not occupied by said miniature setting being unobstructed and presenting a clear view through said frame, said structure comprising interior spaces substantially similar to those of the actual full scale structure of which said miniature structure is a replica, and the front and rear of said miniature structure being provided with apertures communicating with said interior spaces therein, said apertures and spaces being so positioned as to provide a clear sight path from the front through said miniature structure to the exterior, a plurality of controllable sources of light respectively positioned on the sides of said frame for delivering light on said miniature stage setting, and individual means for selectively controlling the intensity of the illumination delivered from each of said sources.

4. In a controllably illuminated miniature stage setting for use as foreground in composite motion picture photography, a frame comprising a support, said frame being open at front and back, a miniature three-dimensional stage setting comprising a miniature three-dimensional structure positioned on said support within said frame and occupying a relatively large part of the field of view enclosed by said frame, the space enclosed by said frame not occupied by said miniature setting being unobstructed and presenting a clear view through said frame, said miniature structure having a smoke aperture therein, means inside of said structure for directing a column of smoke through said smoke aperture, a plurality of controllable sources of light respectively positioned on the sides of said frame for directing light on said miniature stage setting including said smoke emitted from said smoke aperture, and individual means for selectively controlling the intensity of the illumination delivered from each of said sources.

5. In a controllably illuminated miniature stage setting for use as foreground in composite motion picture photography, a frame comprising a support, said frame being open at front and back, a miniature three-dimensional stage setting comprising a miniature three-dimensional structure positioned on said support within said frame and occupying a relatively large part of the field of view enclosed by said frame, the space enclosed by said frame not occupied by said miniature setting being unobstructed and presenting a clear view through said frame, a plurality of controllable sources of light respectively positioned on the sides of said frame for delivering light on said miniature stage setting and individual means for selectively controlling the intensity of the illumination delivered from each of said sources, the sides of said frame being provided with shielding means positioned about said light sources for preventing direct rays from said light sources from passing forwardly to the front of said frame.

6. In a controllably illuminated miniature stage setting for use as foreground in composite motion picture photography, a frame comprising a support, said frame being open at front and back, a miniature three-dimensional stage setting comprising a miniature three-dimensional structure positioned on said support within said frame and occupying a relatively large part of the field of view enclosed by said frame, the space enclosed by said frame not occupied by said miniature setting being unobstructed and presenting a clear view through said frame, the interior of said structure comprising spaces substantially similar to those of the actual full scale structure of which said miniature structure is a replica, and the front and rear of said miniature structure being provided with apertures communicating with said interior spaces therein, said apertures and spaces being so positioned as to provide a clear sight path from the front through said miniature structure to the exterior, a plurality of controllable sources of light respectively positioned on the sides of said frame for delivering light on said miniature stage setting, an interior source of light positioned in said interior space, and individual means for selectively controlling the intensity of the illumination delivered from each of said sources.

VINCENT I. WHITMAN.